March 7, 1967  F. M. KESSLER  3,307,393
STRESS MEASURING DEVICE
Filed Dec. 23, 1963  2 Sheets-Sheet 1

INVENTOR.
FREDERICK M. KESSLER
BY
ATTORNEY

NORMALIZED IMPEDANCE VS STRESS IN STEEL BAR

United States Patent Office 3,307,393
Patented Mar. 7, 1967

3,307,393
STRESS MEASURING DEVICE
Frederick M. Kessler, Bound Brook, N.J., assignor to Ingersoll-Rand Company, New York, N.Y., a corporation of New Jersey
Filed Dec. 23, 1963, Ser. No. 332,511
5 Claims. (Cl. 73—67.1)

This invention relates to a stress determining device and more particularly to a device for mechanically measuring stress in a fastener.

Heretofore, the stress in a fastener such as a bolt, and hence the tightness of the fastener, has usually been measured by determining the degree of torque supplied to the fastener in tightening the latter. This method has been found to be inaccurate and unreliable, and at best provides only an approximation.

It is the general object of the present invention to avoid and overcome the foregoing and other difficulties of and objections to prior art practices by the provision of a new and improved fastener stress measuring device which, although relatively simple and economical in construction, is highly accurate in operation.

Another object of the invention is to provide a new and improved fastener stress measuring device which may be connected to a fastener driving tool for controlling the operation of the fastener driving tool.

The aforesaid objects of the present invention, and other objects which will become apparent as the description proceeds, are attained by the provision of a device comprising a source of electrical energy, and means connected to the source for transmitting mechanical vibrations in response to electrical energy from the source. The vibration transmitting means is connected to one end of a fastener for transmitting mechanical vibrations longitudinally in the fastener from said one end thereof; and means are connected to said one end of said fastener for receiving reflections of the mechanical vibrations transmitted to the fastener and for providing a measurable signal in response to these reflections.

Figure 1:
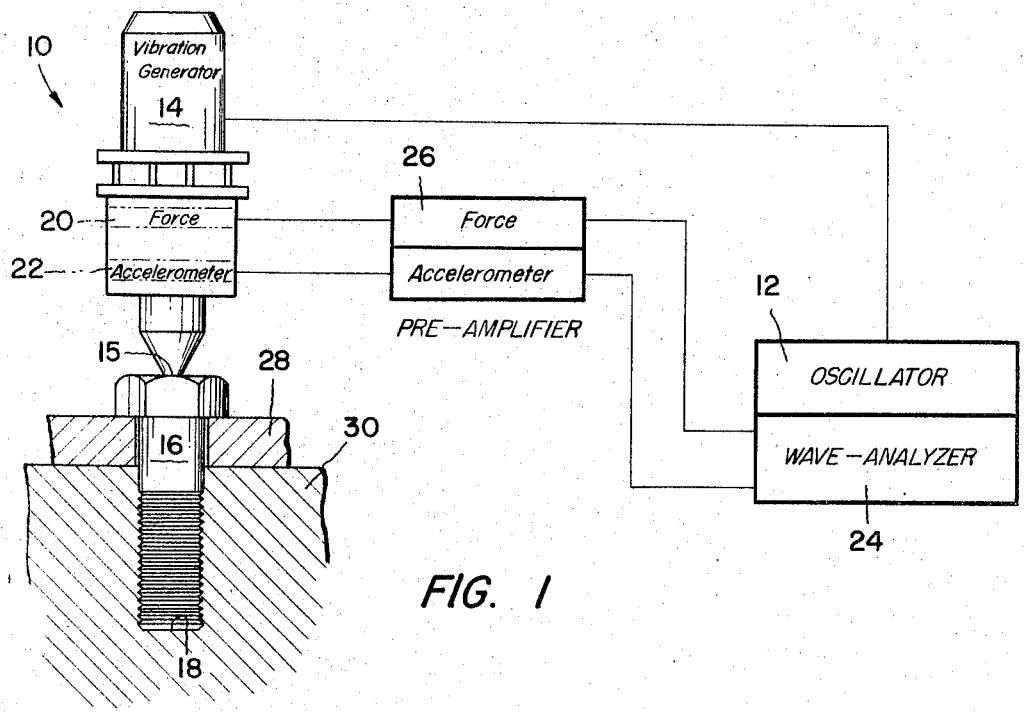
Figure 3:
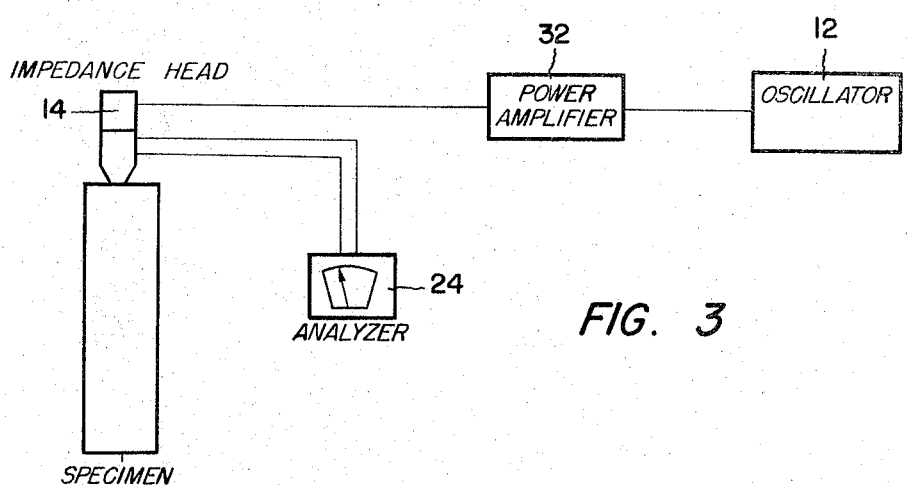
Figure 2:
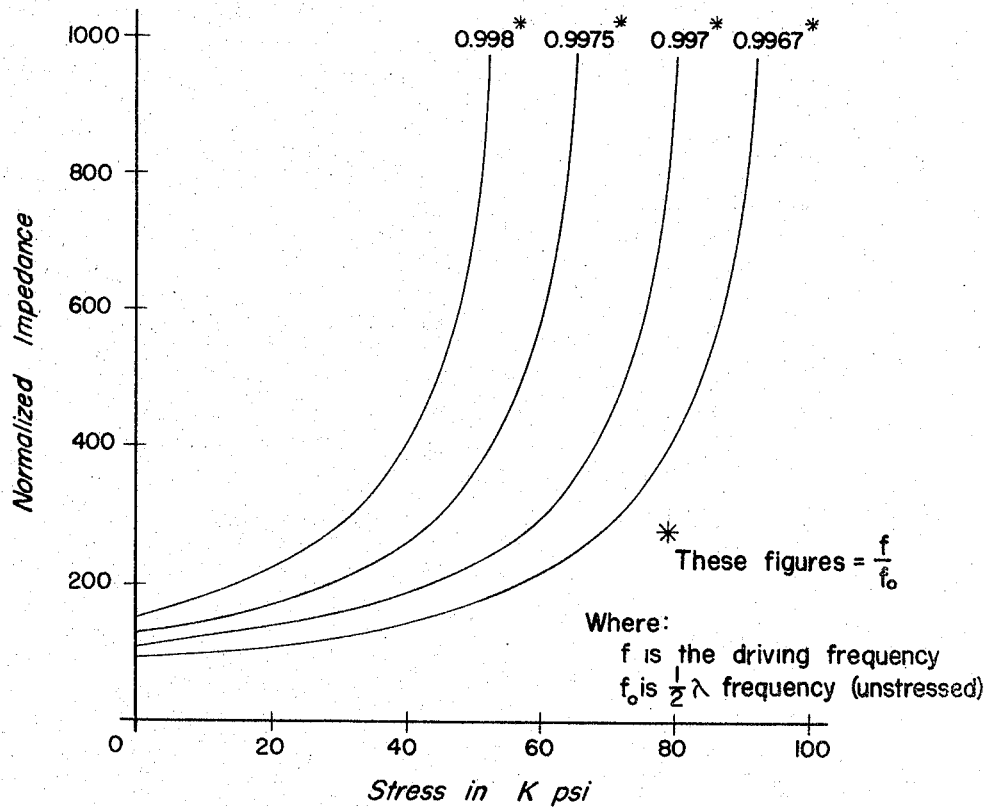

For a better understanding of the present invention reference should be had to the accompanying drawings, wherein like numerals of reference indicate similar parts throughout the several views and wherein;

FIGURE 1 is a schematic representation of one embodiment of the present invention, FIGURE 2 is a set of curves representing the normalized impedance versus stress under test, and FIGURE 3 is a schematic representation of an alternative embodiment of the present invention.

With specific reference to the form of the present invention illustrated in the drawings, and referring particularly to FIGURE 1, a means for determining stress is indicated generally by the reference numeral 10.

It is well known that a fastener such as a bolt 16, when under stress, changes in length. It is obvious therefore that if we know the length of the bolt 16 before it is used as a fastening device, and then we determine the length of the same bolt when it is in its fastening position, a measure of the stress to which the bolt has been subjected may readily be determined.

It is, further, well known in transmission line theory that mechanical impedance and the path length of a vibratory wave may be represented by the following relationship:

$$Z = Z_0 \frac{1 + \Gamma_R \Sigma^{-2\alpha L} \Sigma^{-j 2\beta L}}{1 - \Gamma_R \Sigma^{-2\alpha L} \Sigma^{-j 2\beta L}}$$

where
Z is the driving point impedance
$Z_0$ is the characteristic impedance and is a function of the material
$\Gamma_R$ is the reflection factor
$\alpha$ is the attenuation factor
$\beta$ is the phase relationship
L is the length of the path The impedance of a lossless material, that is $\alpha=0$, with a reflection factor of unity ($\Gamma_R=1$) approaches infinity when L is equal to one half wave length. This may readily be seen from the following relationship which results from Equation 1.

(2)
$$\frac{Z}{Z_0} = \text{Cotangent } \beta L$$

where $\beta = 2\pi/\lambda$
$L = D\lambda$

It is well known that the impedance approaches infinity at one half of a wave length and that the slope of the impedance versus length curve is very steep near the one half wave length so that a small change in length produces a large change in impedance. Consequently an accurate measure of a change in the length of a stressed fastener such as the bolt 16 may be found, and thereby a measure of the stress in the fastener may be obtained, as a result of the relationship expressed in the equation:

(3) $$S = E\epsilon$$

where

E is Young's modulus (modulus of elasticity)
$\epsilon$ is strain

The instantaneous value of impedance (Z) may be expressed as follows:

(4)
$$Z = \frac{F \sin(\omega t)}{V \sin(\omega t) + \phi)}$$

where

F = force
V = velocity
$\phi$ = some phase angle

Referring now to FIGURE 1, an oscillator means 12 is provided to furnish a source of electrical energy at variable frequencies. Such oscillator means 12, per se, are well known to those skilled in the art and are often referred to as "signal generators."

One convenient method for converting the electrical energy supplied by the oscilator means 12 to mechanical vibrations is by utilizing a force driving means or vibration generator 14. The number of vibrations set up by the vibration generator 14 is a function of the frequency of the electrical energy obtained from the oscillator means 12.

It is known that such a force driving means or vibration generator 14 may be employed to propagate mechanical vibrations into a medium to which it is connected. Thus, in the illustrated embodiment of the present invention, the vibration generator 14 is connected to one end of the bolt 16 so that vibrations travel the length of the bolt 16 and reflect from an interface or the end 18 of the bolt 16. The reflections of these mechanical vibrations returns longitudinally through the bolt 16 to provide a response at the end of the bolt 16 to which the vibration generator 14 is connected.

In order to measure the mechanical vibrations propagated down the length of the bolt 16 by the vibration generator 14, a first conversion means 20 is connected to the vibration generator 14 to provide a signal proportional to the mechanical vibrations transmitted in the bolt 16 by the vibration generator 14. A second conversion means 22 is connected to the bolt 16 to provide a signal proportional to the aforementioned response to these mechanical vibrations.

The difficulty in measuring mechanical vibrations and their responses is well known to those skilled in the art. Consequently, the first conversion means 20 and the second conversion means 22 are means for converting mechanical energy to electrical energy. Such means, per se, are well known to those skilled in the art, and are often referred to as transducers. This converted energy, from mechanical to electrical, now becomes a measurable quantity and may be read directly on a means for displaying the measurable quantity such as an analyzer 24, or may be fed to a pre-amplifier 26 and then fed to the analyzer 24. Alternate signals may be used to indicate stress level to control the output of fastener driving tools such as to actuate a control mechanism in such a tool.

The first conversion means or transducer 20 may be so constituted as to convert the mechanical vibrations from the vibration generator 14 into the equivalent electrical force component $F \sin(\omega t)$. The second conversion means or accelerometer 22 converts the mechanical response of the medium or bolt (16) to an equivalent electrical component $V \sin(\omega t + \phi)$ which is, of course, proportional to the vibratory acceleration of the response, and both quantities in turn may be read on the analyzer 24. It should be noted that the Equation 3 is an instantaneous value of impedance, and the values read on the analyzer are R.M.S. (root mean square) values. It is clear however that a direct proportion exists.

One convenient manner of determining the change in length of the bolt 16 due to the resultant stress in fastening together one object 28 to a second object 30 is to utilize Equation 1 wherein all parameters are known except L. However, it is clear that the true determination to be made is the impedance which, as previously described, relates impedance to the change in length.

OPERATION

With the preferred construction shown in FIGURE 1, an unstressed bolt 16 is placed in communication with the oscillator means 12. The oscillator means frequency is varied so that a prescribed impedance will result. This may readily be seen in FIGURE 2 where a family of curves was obtained from Equations 1 and 3, using as coordinates the normalized impedance and stress.

When a value of impedance has been obtained the bolt 16 is then used to fasten one object 28 to a second object 30 so that the bolt 16 is torqued or stressed. Maintaining the oscillator means frequency at the same value and having the vibration generator 14 in communication with the bolt 16 in the stressed condition, mechanical impedance is determined by reading the measurable quantity obtained from the first conversion means 20 and second conversion means 22. This relationship is expressed in Equation 4.

As previously noted, the measure of impedance in the stressed bolt 16 is related to the stress the bolt 16 is experiencing. This relationship is clearly shown in the curves of FIGURE 2.

Alternatively, as shown in FIGURE 3, the alternating signal from the oscillator 12 may be fed to a power amplifier 32 to strengthen the signal. Further, in some cases the pre-amplifiers 26 may be eliminated such that the signals received from the first and second conversion means 20 and 22 may be fed directly to the analyzer 24.

It will be recognized by those skilled in the art that the objects of the present invention have been achieved by providing an inexpensive device for determining the stress in a fastener, which device may be employed for controlling a fastener driving tool.

While in accordance with the patent statutes a preferred embodiment of the present invention have been illustrated and described in detail, it is to be particularly understood that the invention is not limited thereto or thereby.

I claim:
1. A device for measuring the stress in a fastener, comprising:
   a source of electrical energy;
   means connected to said source for transmitting mechanical vibrations in response to electrical energy from said source;
   said vibration transmitting means being connected to one end of said fastener for transmitting mechanical vibrations longitudinally in said fastener from said one end thereof;
   means connected to said vibration transmitting means for providing a signal proportional to the force of the mechanical vibrations transmitted in said fastener by said vibration transmitting means;
   means connected to said one end of said fastener for providing a signal proportional to the vibratory acceleration of the response to the mechanical vibrations received at said one end of said fastener; and
   means connected to said force and acceleration signal providing means for comparing the force and acceleration signals provided thereby.

2. A device for measuring the stress in a fastener, comprising:
   a source of alternating electrical energy;
   means connected to said source for transmitting mechanical vibrations in response to electrical energy from said source;
   said vibration transmitting means being connected to one end of said fastener for transmitting mechanical vibrations longitudinally in said fastener from said one end thereof;
   means connected to said vibration transmitting means for providing a signal proportional to the force of the mechanical vibrations transmitted in said fastener by said vibration transmitting means;
   means connected to said one end of said fastener for providing a signal proportional to the vibratory acceleration of the response to the mechanical vibrations received at said one end of said fastener; and
   means connected to said force and acceleration signal providing means for comparing the force and acceleration signals provided thereby.

3. A device according to claim 2, further comprising:
   means connected between said source of electrical energy and said vibration transmitting means for amplifying the electrical energy supplied to said vibration transmitting means.

4. A device according to claim 2, further comprising:
   means for amplifying the signals provided by said force and acceleration signal providing means prior to their comparison by said comparing means.

5. A device according to claim 2, wherein said source of electrical energy comprises an oscillator, and said comparing means includes a stress indicating gauge for displaying the relationship of the signals provided by said force and acceleration signal providing means.

References Cited by the Examiner

UNITED STATES PATENTS

| | | | |
|---|---|---|---|
| 2,137,852 | 11/1938 | Nicolson | 73—88.5 X |
| 2,431,233 | 11/1947 | Erwin | 73—67.8 |
| 2,600,029 | 6/1952 | Stone | 73—88.5 |
| 3,101,608 | 6/1963 | Benson et al. | 73—67.5 |
| 3,224,253 | 12/1965 | McKay | 73—67 |

FOREIGN PATENTS

| | | |
|---|---|---|
| 211,756 | 11/1960 | Austria. |
| 118,648 | 8/1958 | Russia. |

OTHER REFERENCES

Hikata et al., "Freqency Dependence of Ultrasonic Attenuation and Velocity on Plastic Deformation," Journal of Applied Physics, volume 28, No. 5, May 1957, pages 522–523.

RICHARD C. QUEISSER, *Primary Examiner.*

C. A. RUEHL, *Assistant Examiner.*